July 25, 1933.   H. N. SMITH   1,920,023
MACHINE FOR MAKING FRICTION ELEMENTS
Filed Oct. 27, 1930   2 Sheets-Sheet 1
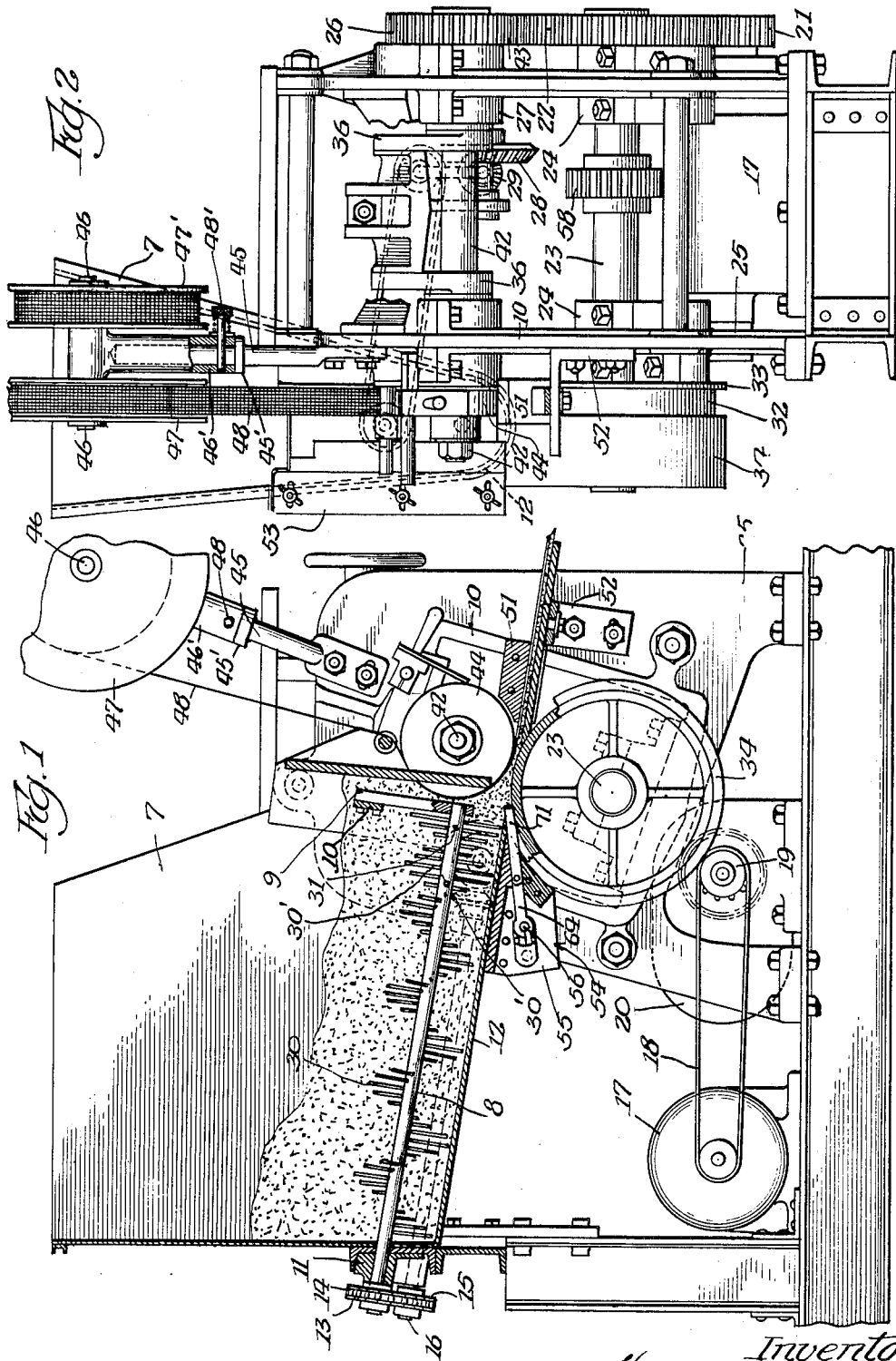
Inventor
Harry N. Smith
By Wm O Bell Atty July 25, 1933.   H. N. SMITH   1,920,023
MACHINE FOR MAKING FRICTION ELEMENTS
Filed Oct. 27, 1930   2 Sheets-Sheet 2
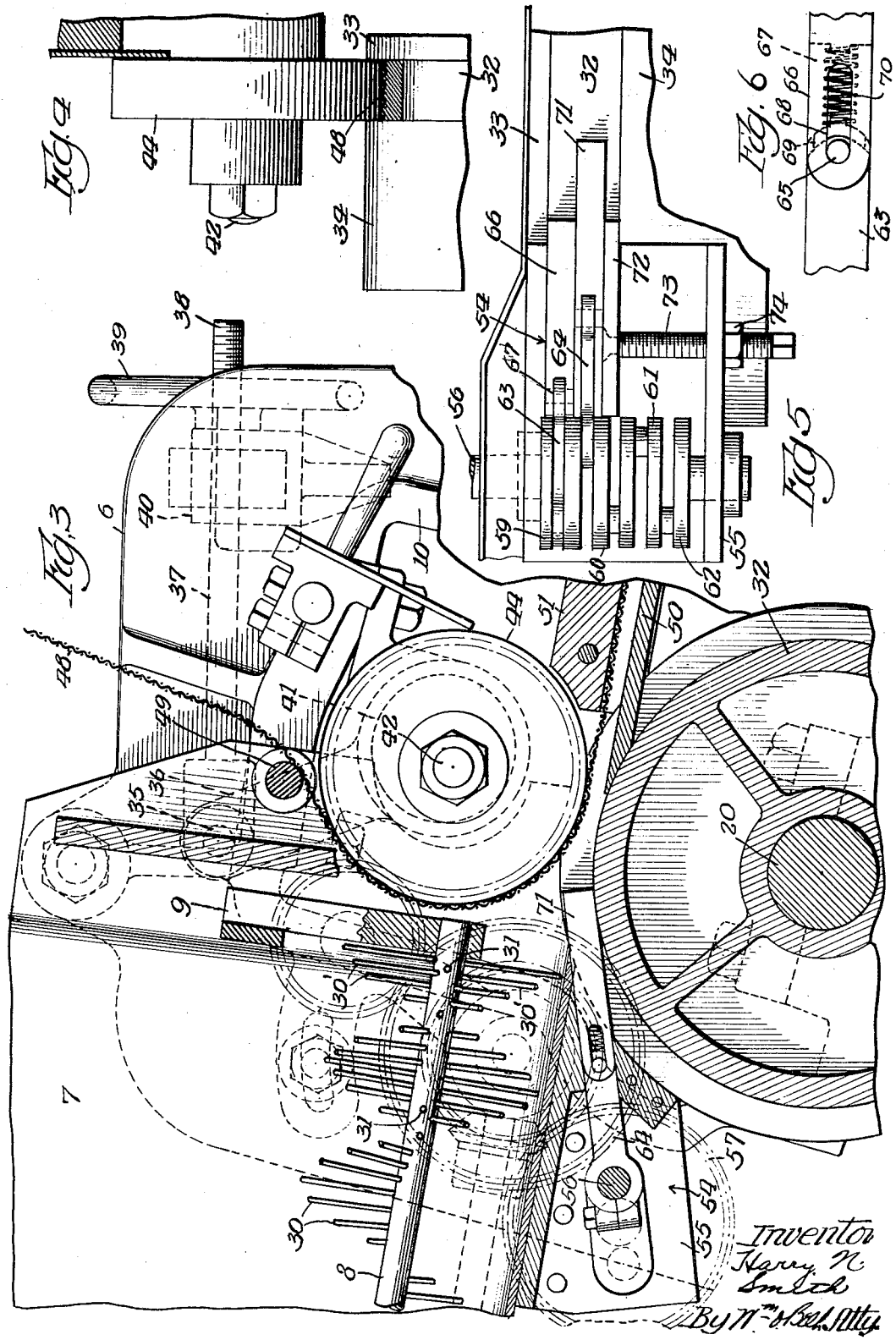

Patented July 25, 1933

1,920,023

UNITED STATES PATENT OFFICE

HARRY N. SMITH, OF DETROIT, MICHIGAN, ASSIGNOR TO AMERICAN BRAKEBLOK CORPORATION, OF NEW YORK, N. Y., A CORPORATION OF NEW YORK

MACHINE FOR MAKING FRICTION ELEMENTS

Application filed October 27, 1930. Serial No. 491,375.

This invention relates to certain novel improvements in machines for making friction elements and the like wherein a material is introduced in a hopper and extruded therefrom to be formed into a strip-like member including a suitable reenforcing backing.

The salient objects of the invention are to provide a novel machine wherein the material is introduced into a hopper from which the material is extruded by a device arranged at the lower end of the hopper; in which the device at the lower end of the hopper will not only bring about an extruding of the material but will also agitate the material in order that a uniform amount of the material may be extruded from the hopper; in which the device is arranged to include a portion bringing about a feeding action adjacent the discharge opening of the hopper in a manner which insures the discharge of sufficient, yet not excessive, material; in which the device for bringing about the extruding or discharge of the material is so constructed that packing of the material therein will be substantially obviated; in which a device is provided for packing the material into the forming members in order that a substantially uniform amount of the material is fed to the forming members in order that a uniform product is attained irrespective of the thickness thereof; and in which the forming members are adjustable relative to each other in order that strips of different thicknesses and widths may be formed in the machine.

A selected embodiment of the invention is illustrated in the accompanying drawings and therein Fig. 1 is a side view, partly in elevation and partly in section, of a machine constructed in accordance with my invention;

Fig. 2 is a front elevation of the machine illustrated in Fig. 1;

Fig. 3 is a fragmentary view, drawn to an enlarged scale, showing the feeding, packing and forming means of my improved device;

Fig. 4 is a fragmentary detail view illustrating the forming and compressing portions of the machine;

Fig. 5 is a fragmentary plan view of the packing means employed in the machine; and Fig. 6 is a fragmentary side view of a portion of the arrangement illustrated in Fig. 5.

The machine, as disclosed in the accompanying drawings, is an improvement over the machine described and claimed in my co-pending application, Serial No. 402,100, filed October 24, 1929. In the machine disclosed in that application a belt is provided on which cleats are arranged, and this belt serves to carry material from a hopper out to forming members. In the present machine a hopper 7 is provided which is substantially similar to the hopper disclosed in my referred to application, but in place of the belt I provide a screw, generally indicated by 8, which is arranged at the lower end of the hopper 7. One end of the screw 8 is journaled in a bearing provided at the lower end of an arm 9 carried by the bracket 10, and the opposite end of the screw is journaled in a suitable bearing structure 11 provided at the rear end of the hopper 7, the end of the screw journaled in the arm 9 serving as the discharge end. As clearly illustrated in the drawings, the lower wall 12 of the hopper 7 is inclined and the screw is similarly inclined. On the shaft of the screw 8, outwardly of the bearing 11, a sprocket 13 is provided about which a chain 14 is disposed, said chain also being disposed around the sprocket 15 mounted on the drive shaft 16. A suitable source of power as, for example, the motor 17, is provided which is connected by the belt 18 to the pulley 19 of the speed reducing unit 20, which speed reducing unit 20 includes a gear 21 which meshes with the gear 22 on the shaft 23 that is journaled in bearings 24, 24 carried by the frame 25 of the machine. The gear 22 meshes with a gear 26 mounted on a stub shaft journaled in the bearings 27, and the stub shaft carries a bevel gear 28 which meshes with a bevel gear 29 at the inner end of the shaft 16. The member, indicated by 8, has been referred to as a screw member, for a plurality of pins 30 are arranged therein which extend radially therefrom, and these pins are disposed to extend radially from the shaft of the screw member 8 in helical formation. Throughout the major extent of the screw 8, the pins 30 extend in but one direction from the shaft and therefore a single lead screw is defined. However, the pins 30 in the last convolute of the helical formation, at the end adjacent the discharge opening of the hopper, are extended in both directions from the shaft, as indicated at 30′, and thus a screw of double lead is provided adjacent the discharge end of the screw member 8. In addition to the double screw formation in the last convolute of the helical formation of the pins 30, parallel pins 31, 31 are extended diametrically through the shaft 8, one of the pins 31 being disposed at the extreme end of the helical formation of the pins 30 and the other of these pins being disposed adjacent the end of the first convolute of the helical formation. These pins 31 serve as breaker or agitating pins for a purpose to be set forth presently. The material to be handled by this device is somewhat fluffy and has a tendency to readily pack. I have found that this tendency to pack may be best obviated by using a single lead screw to bring about the feeding thereof as such a screw more thoroughly agitates the material and prevents packing of the material in the convolutions of the screw, and this tendency to pack is also obviated by using, in place of a solid screw, a screw formed from a plurality of suitably disposed pins as has been described. Therefore, after the material has been introduced into the hopper 7, the screw is set in operation so as to rotate in the direction of lead of the helical disposition of the pins 30, and thus the material is fed toward the discharge opening of the hopper. As the material is fed along by the screw 8, it is agitated by the pins 30, and when the material is fed to the last convolutions of the pins 30 the feed thereof is accelerated by reason of the double lead of the screw in this last convolution, and thus the material is effectively forced through the discharge opening of the hopper, the pins 31 tending to break up the material and prevent packing thereof so as to prevent lumps of material being forced through the discharge opening. Mounted on the shaft 23 on the end thereof opposite that carrying the gear 22 is a forming roller 32 having a flange 33 thereon, and also mounted on the roller 32 is a collar 34, said collar being removably mounted on said roller in order that it may be removed and replaced by a similar collar, and thus collars of different widths may be arranged on the roller 32 and thus the space between the inner edge of the collar and the flange 33 may be varied, which will control the width of the strip produced by the machine. If desired, the collar may be disposed at different places on the roller, without removal therefrom, which will also vary the space between the collar and the flange. On the shaft 35 arms 36 are arranged which are connected to the rod 37 including a screw-threaded portion 38 on which the hand wheel 39 operates, and by rotating said hand wheel 39 relative to the bearing 40 supporting one end of the rod 37 the position of the rod may be varied, and therefore the position of the arms may also be varied. In the arms 36 eccentric bushings 41 are mounted which support a shaft 42 having a gear 43 on one end thereof which meshes with the gear 22. On the opposite end of the shaft 42 there is a roller 44 which cooperates with the roller 32 and preferably fits the space between the flange 33 and the collar 34. When the position of the arms 36 is varied the space between the rollers 32 and 44 is varied and in this manner the thickness of the strip formed therebetween is varied. Extending upwardly from the frame 25 is a supporting member 45 having a collar 45′ thereon against which the lower end of the tubular stem of the substantially T-shaped bracket 46′ abuts. The branches of the T-shaped bracket 46′ are formed by a shaft 46, and mounted on this shaft are two spools 47 and 47′. A keeper pin arrangement 48′ is provided and by properly positioning this keeper pin arrangement either the spool 47 or the spool 47′ may be arranged in unreeling position. Wound on the spool 47, which is disposed in unreeling position, is a reticulated strip 48, and this strip is directed from the spool 47 past the guide pin 49 and about the roller 44 so as to extend over the portion of the periphery of said roller 44 adjacent the roller 32. The spool 47′ is in what may be termed loading position, and as soon as the strip 48 is unwound from the spool 47, the keeper pin 48′ is withdrawn to permit turning of the bracket 46′, and the spool 47′ is arranged in unreeling position and the free end of the strip 48 wound thereon is attached to the end of the strip 48 that has disengaged the spool 47, and in this manner the machine may be continually operated, for the empty spool 47 will now be removed and a full spool substituted therefor, and this full spool will be moved until unreeling position when all of the strip has been unwound from the spool 47′. The material extruded from the discharge opening in the hopper 7 is forced toward the rollers 44 and 32 and passes therebetween to be compressed thereby. As the material is in a somewhat plastic condition and by reason of the fact that the rollers are rotating away from the hopper 7, the material will be effectively compressed by the rollers and joined to the reticulated strip 48, and the material compressed by the rollers and joined with the strip 48 passes out on the delivery platform 50 below the riding weight 51 which is held against displacement by the weight thereof resting on the strip and by engagement thereof with the bracket 52. In order that the discharge opening from the hopper 7 will be of a proper size relative to the space between the flange 33 and the collar 34 and the space between the rollers 32 and 44, an adjustable plate 53 is mounted over the discharge opening of the hopper 7, and this adjustable plate determines the size of the discharge opening and preferably the size of this discharge opening is such that the quantity of material forced from the hopper 7 will be of a volume such that it will compress substantially four times when passed between the rollers 44 and 32. In order to insure the passage of a sufficient quantity of material to the rollers 44 and 32 when a relatively thick strip is to be formed therebetween, I provide a packing arrangement, generally indicated by 54, which includes a frame 55 in which a shaft 56 is journaled, which shaft 56 may be connected through the gear 57 to a gear 58 (Fig. 2) on the shaft 23 or to any other suitable point to be rotated. As best illustrated in Fig. 5, oppositely directed, alternately arranged cranks 59, 60, 61 and 62 are provided on the shaft 56, and in the present instance only the cranks 59 and 60 are utilized, the additional cranks being used when the collar 34 is spaced from the flange 33 in an amount greater than that illustrated. Connected to the crank 59 is a crank arm 63 and a similar crank arm 64 is connected to the crank 60. As best illustrated in Fig. 6, a pin 65 is provided in the end of the crank arm 63. A plunger 66 is provided which includes a bifurcation 67 and in the limbs, on opposite sides of the bifurcation, slots, such as 68, are provided into which the pin 65 is extended. A spring anchor 69 engages the end of the crank arm 63 and a spring 70 extends between the anchor 69 and the end of the bifurcation 67 and normally urges the pin into the position illustrated in Fig. 6 at the outer ends of the slots 68. Therefore, when the crank 59 is operated the plunger 66 will be forced inwardly into engagement with the material extruded through the discharge opening in the hopper 7, and this plunger will force the material between the rollers 44 and 32. If, however, an excessive amount of material is present, the plunger 66 will encounter resistance and therefore said plunger will be moved against the action of the spring 70, and thus a yieldable arrangement is provided which eliminates the likelihood of an excessive amount of material being forced between the rollers. In a similar manner, a plunger 71 is connected to the crank 60. It is unlikely that the combined width of the plungers 66 and 71, or if additional plungers are provided on the other cranks, the combined width of these cranks, will equal the width of the space between the flange 33 and the collar 34. I therefore provide spacers, such as 72, which may be employed to fill in the space between the plungers and the collar 34. As many of these spacers as necessary will be provided, and preferably the outermost of the spacers will be joined to the screw 73 mounted in the frame 55 of the packer device 54, said screw being movable to provide an adjustment and being held in adjusted position by the lock nut 74.

It is manifest from the foregoing description that I have provided a machine in which friction elements and the like may be formed into strip formation and that I have provided this machine with a means whereby the material is extruded from the hopper into which it is introduced in a uniform manner. Furthermore, I have provided an arrangement whereby the material extruded in this uniform manner is forced toward the forming device. However, I have found that this latter device need not be employed unless so desired as a uniform product is produced by merely relying on the uniform feed provided by the screw 8, and thus if desired the packer 54 may be removed from the machine. However, it is advantageous to employ the packer under certain conditions, especially when a relatively thick strip is to be formed in the device. Furthermore, by providing a screw constructed in the manner described, the material in the hopper is agitated and uniformly fed so that the likelihood of lumps of material or other undesirable conditions are eliminated. As the screw 8, providing the feeding means, the packer 54, providing the material forcing means, and rollers 32 and 44, providing the forming means, are operated from a common source of power it is apparent that synchronic operation of these parts is easily attained.

While I have illustrated and described a selected embodiment of my invention, it is to be understood that this is capable of variation and modification and I therefore do not wish to be limited to the precise details set forth but desire to avail myself of such changes and alterations as fall within the spirit and scope of the following claims.

I claim:

1. In a machine of the class described, a hopper having a discharge opening therein, forming means, a screw member mounted in said hopper, means for rotating said screw member whereby material will be forced thereby through said discharge opening to said forming means, said screw member having the convolutions thereof provided by a plurality of spaced apart pins extending radially from the axial portion thereof, said pins being arranged to provide a single lead on said screw member throughout the main portion of the extent thereof and being arranged to provide a double lead on said screw member in the portion thereof adjacent said discharge opening, and other pins extending diametrically through said shaft in the portion thereof provided with a double lead.

2. In a machine of the class described, a hopper having a discharge opening, forming means, means for feeding material from said hopper through said discharge opening to said forming means, means for forcing the material passed through said discharge opening into said forming means, and means providing a yieldable portion in said forcing means whereby only a proper amount of material will be forced into said forming means.

3. In a machine of the class described, a hopper having a discharge opening therein, forming means, means for feeding material from said hopper through said discharge opening, and reciprocal yieldable plungers for forcing the material fed through said discharge opening into said forming means.

4. In a machine of the class described, a hopper having a discharge opening therein, forming means, means for feeding material from said hopper through said discharge opening, reciprocal plungers, means for operating said plungers whereby said plungers will force said material passed from said discharge opening into said forming means, and means yieldably connecting said plungers to said operating means.

5. In a machine of the class described, a hopper having a discharge opening therein, forming means, means for feeding material from said hopper through said discharge opening, reciprocal plungers, means for operating said plungers whereby said plungers will force said material passed through said discharge opening into said forming means, and means for yieldably connecting said plungers to said operating means.

6. In a machine of the class described, a hopper having a discharge opening therein, means for feeding material from said hopper through said discharge opening, variable forming means, and means including yieldable portions for forcing material fed through said discharge opening into said forming means, said forcing means including portions adapted to be adjusted whereby said forcing means may be varied to correspond to variations of said forming means.

7. In a machine of the class described, a hopper having a discharge opening therein, means for varying the size of said discharge opening, variable forming means, and means for forcing material fed through said discharge opening into said forming means, said forcing means including portions adapted to be adjusted whereby said forcing means may be varied to correspond to variations of said forming means and the size of said discharge opening.

8. A machine of the class described including a hopper having an inclined lower wall and having a discharge opening adjacent the lowermost portion of said wall, means arranged parallel with said wall for feeding material from said hopper through said discharge opening, forming means adjacent said discharge opening, means operating said feeding means and said forming means whereby material from said hopper is fed into said forming means and compressed therein into strip formation, means directing a reenforcing member for said strip to said forming means whereby said material is joined with said reenforcing member by said forming means, means supporting a supply of said reenforcing member in supplying position, said means including a portion on which an additional supply of said reenforcing member is arranged whereby when all of the reenforcing member has been withdrawn from the means supporting it in supplying position said additional supply of said reenforcing member may be quickly moved into supplying position.

9. In a machine of the class described, a hopper having a discharge opening therein, means for varying the size of said discharge opening, forming means, and means for forcing material fed through said discharge opening into said forming means, said forcing means including portions adapted to be adjusted whereby said forcing means may be varied to correspond to variations in the size of said discharge opening.

10. A machine of the class described including a hopper having a discharge opening, means for feeding material from said hopper through said discharge opening, forming means adjacent said discharge opening, means operating said feeding means and said forming means whereby material from said hopper is fed into said forming means and compressed therein into strip formation, means directing a reenforcing member for said strip to said forming means whereby said material is joined with said reenforcing member by said forming means, and means supporting a supply of said reenforcing member in supplying position, said means including a portion on which an additional supply of said reenforcing member is arranged whereby when all of said reenforcing member has been withdrawn from the means supporting it in supplying position said additional supply of said reenforcing member may be quickly moved into supplying position.

11. A machine of the class described including a hopper having a discharge opening, means for feeding material from said hopper through said discharge opening, forming means adjacent said discharge opening, means operating said feeding means and said forming means whereby material from said hopper is fed into said forming means and compressed therein into strip formation, means directing a reenforcing member for said strip to said forming means whereby said material is joined with said reenforcing member by said forming means, and a substantially T-shaped bracket including a portion supporting a supply of said reenforcing member in supplying position and including another portion supporting an additional supply of said reeforcing member whereby when all of said reenforcing member has been withdrawn from the supply thereof in supplying position said bracket may be moved to move said additional supply of said reenforcing member into supplying position so that said reenforcing member may be continuously fed to said forming means.

HARRY N. SMITH.